(12) United States Patent
Chu et al.

(10) Patent No.: US 10,970,686 B2
(45) Date of Patent: Apr. 6, 2021

(54) TESTING POWER REUSE SYSTEM, POWER REUSE CIRCUIT AND TESTING POWER REUSE METHOD

(71) Applicant: FSP TECHNOLOGY INC., Taoyuan (TW)

(72) Inventors: Ting-Chuan Chu, Taoyuan (TW); Hsin-Chu Liang, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 177 days.

(21) Appl. No.: 16/244,112

(22) Filed: Jan. 10, 2019

(65) Prior Publication Data
US 2019/0228387 A1 Jul. 25, 2019

(30) Foreign Application Priority Data
Jan. 24, 2018 (TW) .................................. 107102444

(51) Int. Cl.
*G06Q 20/06* (2012.01)
*H02J 13/00* (2006.01)
*G01R 1/00* (2006.01)

(52) U.S. Cl.
CPC ............ *G06Q 20/065* (2013.01); *H02J 13/00* (2013.01); *G01R 1/00* (2013.01)

(58) Field of Classification Search
CPC ......... G06Q 20/065; H02J 13/00; G01R 1/00; G01R 31/28; G06F 11/2205; G06F 11/2273; G06F 1/26
See application file for complete search history.

(56) References Cited

U.S. PATENT DOCUMENTS

| 2010/0111071 A1* | 5/2010 | Khare ..................... H04L 67/18 370/352 |
| 2019/0220856 A1* | 7/2019 | Li .......................... G06Q 20/10 |
| 2019/0370761 A1* | 12/2019 | Iwanami ................ G06Q 20/40 |

OTHER PUBLICATIONS

Philip A. Godoy, Student Member, IEEE, David J. Perreault, Senior Member, IEEE, and Joel L. Dawson, Member, IEEE (Year: 2009).*

* cited by examiner

*Primary Examiner* — Christopher P McAndrew
*Assistant Examiner* — Zannatul Ferdous
(74) *Attorney, Agent, or Firm* — JCIPRNET

(57) ABSTRACT

A testing power reuse system including a testing device, a virtual currency calculating circuit, and a power reuse circuit is provided. The power reuse circuit is coupled to the testing device through a first interface circuit and is coupled to the virtual currency calculating circuit through a second interface circuit. The power reuse circuit is configured to receive power generated by performing a testing operation on the testing device through the first interface circuit and provide the power to the virtual currency calculating circuit through the second interface circuit. The virtual currency calculating circuit is driven by the power to perform a virtual currency calculating operation. A power reuse circuit and a testing power reuse method are also provided.

17 Claims, 4 Drawing Sheets

TESTING POWER REUSE SYSTEM, POWER REUSE CIRCUIT AND TESTING POWER REUSE METHOD

CROSS-REFERENCE TO RELATED APPLICATION

This application claims the priority benefit of Taiwan Application No. 107102444, filed on Jan. 24, 2018. The entirety of the above-mentioned patent application is hereby incorporated by reference herein and made a part of this specification.

TECHNICAL FIELD

The invention relates to a power reuse system; particularly, the invention relates to a testing power reuse system, a power reuse circuit, and a testing power reuse method.

DESCRIPTION OF RELATED ART

During the production and testing of certain electronic devices, excessive power is generated, and such excess power is often consumed in various meaningless ways. For instance, during testing of a power supply, electric power generated in the testing process is consumed in a form of heat energy through a cement resistor, which leads to unnecessary waste of energy.

SUMMARY

In view of the above, the invention provides a testing power reuse system, a power reuse circuit, and a testing power reuse method to effectively improve the use efficiency of the testing power.

In an embodiment of the invention, a testing power reuse system including at least one testing device, at least one virtual currency calculating circuit, and a power reuse circuit is provided. The power reuse circuit is coupled to the testing device through at least one first interface circuit and coupled to the virtual currency calculating circuit through at least one second interface circuit. The power reuse circuit is configured to receive power generated by performing a testing operation on the testing device through the first interface circuit and provide the power to the virtual currency calculating circuit through the second interface circuit. The virtual currency calculating circuit is driven by the power to perform a virtual currency calculating operation.

According to an embodiment of the invention, a total number of the testing device is at least two.

According to an embodiment of the invention, power output from a first testing device of the testing device complies with a first power specification, power output from a second testing device of the testing device complies with a second power specification, and the first power specification is different from the second power specification.

According to an embodiment of the invention, the power reuse circuit includes a first power transmission circuit and a second power transmission circuit, the first power transmission circuit provides a first power transmission path between the testing device and the virtual currency calculating circuit, the second power transmission circuit provides a second power transmission path between the testing device and the virtual currency calculating circuit, and the first power transmission path and the second power transmission path are electrically isolated from each other.

According to an embodiment of the invention, the power reuse circuit includes a testing communication interface. The testing communication interface is configured to monitor a testing state of the testing device.

According to an embodiment of the invention, the power reuse circuit includes a switch circuit. The switch circuit is configured to control a conductive state of a power transmission path between the testing device and the virtual currency calculating circuit.

According to an embodiment of the invention, the testing device includes a power supply.

According to an embodiment of the invention, the virtual currency calculating circuit includes a power interface circuit, a calculating chip, and a network interface circuit. The power interface circuit is coupled to the second interface circuit to receive the power, and the calculating chip is coupled to the power interface circuit and the network interface circuit. The calculating chip is configured to perform the virtual currency calculating operation and transmit a virtual currency calculating result to a network through the network interface circuit.

In another embodiment of the invention, a power reuse circuit includes at least one first interface circuit, at least one second interface circuit, and a power transmission circuit. The power transmission circuit is coupled to the first interface circuit and the second interface circuit. The power transmission circuit is configured to receive power generated by performing a testing operation on at least one testing device through the first interface circuit and provide the power to at least one virtual currency calculating circuit through the second interface circuit, so that the virtual currency calculating circuit is driven by the power to perform a virtual currency calculating operation.

According to an embodiment of the invention, a total number of the at least one first interface circuit is at least two.

According to an embodiment of the invention, power received from one of the at least one first interface circuit complies with a first power specification, power received from another one of the at least one first interface circuit complies with a second power specification, and the first power specification is different from the second power specification.

According to an embodiment of the invention, the power transmission circuit includes a first power transmission circuit and a second power transmission circuit, the first power transmission circuit provides a first power transmission path between the first interface circuit and the second interface circuit, the second power transmission circuit provides a second power transmission path between the first interface circuit and the second interface circuit, and the first power transmission path and the second power transmission path are electrically isolated from each other.

According to an embodiment of the invention, the power reuse circuit further includes a testing communication interface. The testing communication interface is coupled to the first interface circuit. The testing communication interface is configured to monitor a testing state of the testing device.

According to an embodiment of the invention, the power reuse circuit further includes a switch circuit. The switch circuit is coupled to the power transmission circuit. The switch circuit is configured to control a conductive state of a power transmission path between the first interface circuit and the second interface circuit.

According to an embodiment of the invention, the power reuse circuit is not equipped with an electronic load element configured for consuming the power by heat.

In another embodiment of the invention, a testing power reuse method includes: performing a testing operation on at least one testing device; receiving power generated by performing the testing operation on the testing device through at least one first interface circuit; providing the power to at least one virtual currency calculating circuit through at least one second interface circuit; driving the virtual currency calculating circuit by the power to perform a virtual currency calculating operation.

In light of the foregoing, after the testing operation is performed on the testing device, the power (also referred to as testing power) generated by performing the testing operation may be reused for driving the virtual currency calculating circuit to perform the virtual currency calculating operation. Thereby, the use efficiency of the testing power can be effectively improved.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
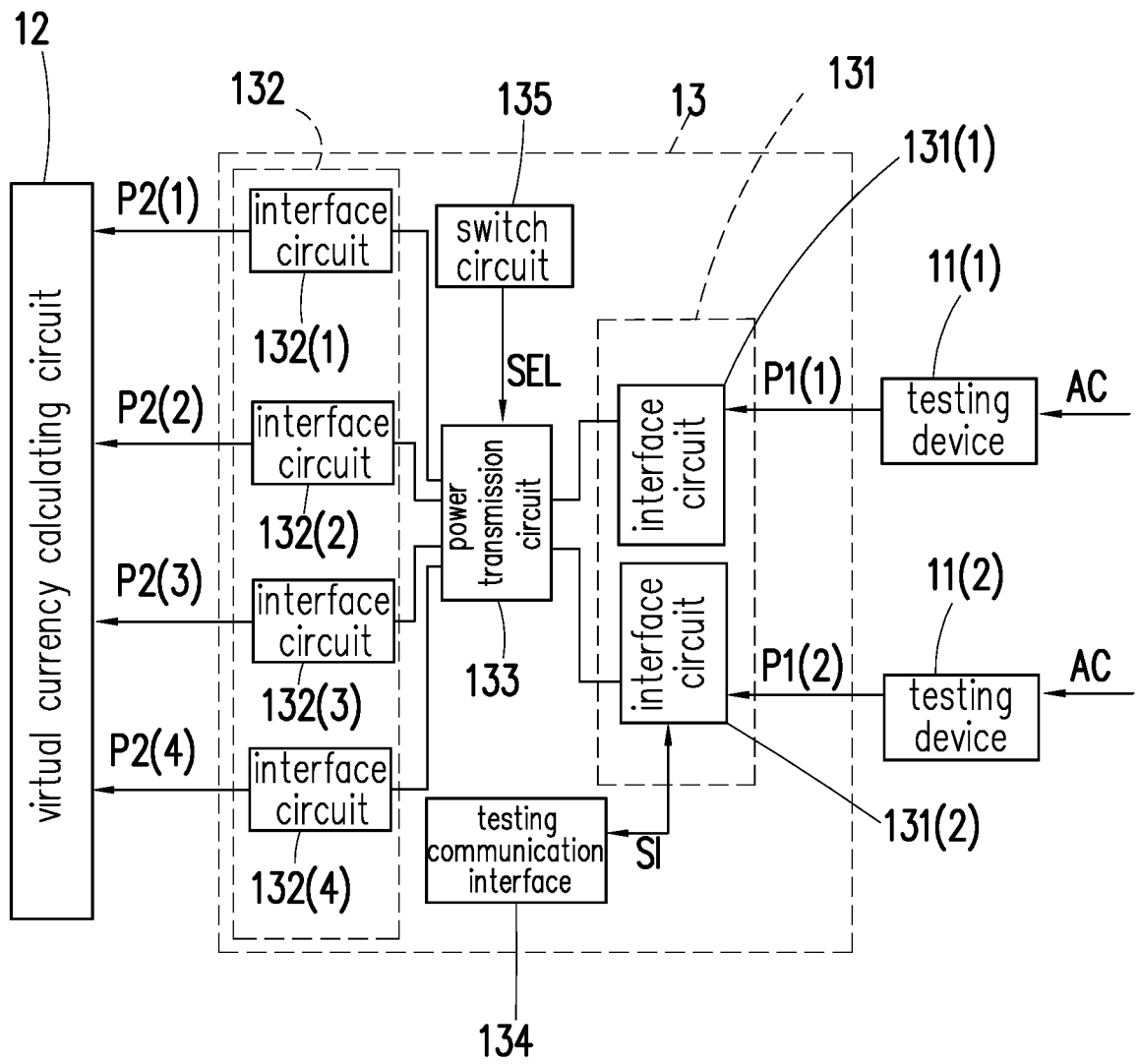
FIG. 1 is a schematic view of a testing power reuse system according to an embodiment of the invention.

FIG. 1 is a schematic view of a testing power reuse system according to an embodiment of the invention. With reference to FIG. 1, a testing power reuse system 10 includes a testing device (also referred to as a first testing device) 11(1), a testing device (also referred to as a second testing device) 11(2), a virtual currency calculating circuit 12, and a power reuse circuit 13. In the present embodiment, the testing devices 11(1) and 11(2) are both power supplies. In another embodiment, the number of the testing devices 11(1) and 11(2) may be more or may be less, and the invention is not limited thereto.

The virtual currency calculating circuit 12 is configured to perform a virtual currency calculating operation to obtain various virtual currencies (also referred to as Cryptocurrencies), such as Ethereum, BitCoin, and the like, and the virtual currencies can be circulated on the Internet. For instance, users can use the virtual currencies circulating on the Internet for online transactions. The virtual currency calculating circuit 12 may be any type of computer system capable of performing networking and computing functions. According to an embodiment, the virtual currency calculating circuit 12 is also referred to as mining equipment. Besides, the number of the virtual currency calculating circuit 12 can be more, and the invention is not limited thereto.

The power reuse circuit 13 includes an interface circuit module 131 and an interface circuit module 132. The interface circuit module 131 is configured to couple the power reuse circuit 13 to the testing devices 11(1) and 11(2). The interface circuit module 132 is configured to couple the power reuse circuit 13 to the virtual currency calculating circuit 12. In the present embodiment, the interface circuit module 131 includes interface circuits 131(1) and 131(2), and the interface circuit module 132 includes interface circuits 132(1)-132(4). According to an embodiment, each of the interface circuits 131(1) and 131(2) is also referred to as the first interface circuit, and each of the interface circuits 132(1)-132(4) is also referred to as the second interface circuit. The total number of the first interface circuit and the total number of the second interface circuit may be more or may be less, and the invention is not limited thereto.

The interface specification of the first interface circuit may comply with a serial advanced technology attachment (SATA) standard, a peripheral component interconnect express (PCI Express) standard, or other types of interface specifications, and the invention is not limited thereto. The interface specification of the second interface circuit may comply with the PCI Express standard, a universal serial bus (USB) standard, or other types of interface specifications, and the invention is not limited thereto.

In the present embodiment, the testing devices 11(1) and 11(2) both have the function of converting an alternating current into a direct current. The output power of the testing devices 11(1) and 11(2) may be different; for instance, the output power of the testing device 11(1) may be 1600 watts, and the output power of the testing device 11(2) may be 800 watts. During a process of performing a testing operation on at least one of the testing devices 11(1) and 11(2), the testing devices 11(1) and 11(2) under the test outputs the corresponding power (also referred to as testing power). For instance, the power specification of the output testing power may be at 5 volts, 12 volts, or within a certain voltage range, and the invention is not limited thereto.

In the present embodiment, the power output from the testing device 11(1) complies with a certain power specification (also referred to as a first power specification), and the power output from the testing device 11(2) complies with another power specification (also referred to as a second power specification). According to an embodiment, the first power specification is the same as the second power specification. For instance, the voltage of the power output from the testing devices 11(1) and 11(2) is 5 volts. However, in another embodiment, the first power specification may be different from the second power specification. For instance, the voltage of the power output from the testing device 11(1) may be 5 volts, and the voltage of the power output from the testing device 11(2) may be 12 volts.

In the present embodiment, the testing operation is performed to test whether the power specification of the power output from the testing devices 11(1) and 11(2) during a testing time range complies with certain standard. In another embodiment, the testing operation may be further performed to test at least one type of hardware performance of the testing devices 11(1) and 11(2), and the invention is not limited thereto.

The power reuse circuit 13 is configured to receive the power generated by performing the testing operation on the testing devices 11(1) and 11(2) through the interface circuit module 131. The power reuse circuit 13 may then provide the power to the virtual currency calculating circuit 12 through the interface circuit module 132. The virtual currency calculating circuit 12 may be driven by the power coming from the interface circuit module 132 to perform the virtual currency calculating operation. That is, during the process of performing the testing operation on at least one of the testing devices 11(1) and 11(2), the testing power generated therefrom is not wasted (e.g., in form of heat energy) but is provided to the virtual currency calculating circuit 12 to drive the virtual currency calculating circuit 12 to perform the virtual currency calculating operation.

In the present embodiment, the power reuse circuit 13 further includes a power transmission circuit 133. The power transmission circuit 133 is coupled between the interface circuit modules 131 and 132 to provide at least one power transmission path. Thereby, the power generated by performing the testing operation may be transmitted to the virtual currency calculating circuit 12 through the power transmission circuit 133. Besides, in an embodiment, the power transmission circuit 133 may further include a voltage stabilizing circuit and/or a voltage dividing circuit, so as to stabilize, boost, and/or lower the voltage, and the invention is not limited thereto.

Particularly, when the testing operation is performed on the testing devices 11(1) and 11(2), power AC may be input to the testing devices 11(1) and 11(2), and the testing devices 11(1) and 11(2) may respectively output power P1(1) and power P1(2). Here, the power AC is alternating current power, and the power P1(1) and the power P1(2) are direct current power. The interface circuit 131(1) may receive the power P1(1) and transmit the power P1(1) to the power transmission circuit 133. The interface circuit 131(2) may receive the power P1(2) and transmit the power P1(2) to the power transmission circuit 133. The power transmission circuit 133 may then transmit the received power to the interface circuits 132(1)-132(4), and the interface circuits 132(1)-132(4) may transmit the powers P2(1)-P2(4) to the virtual currency calculating circuit 12.

Figure 2:
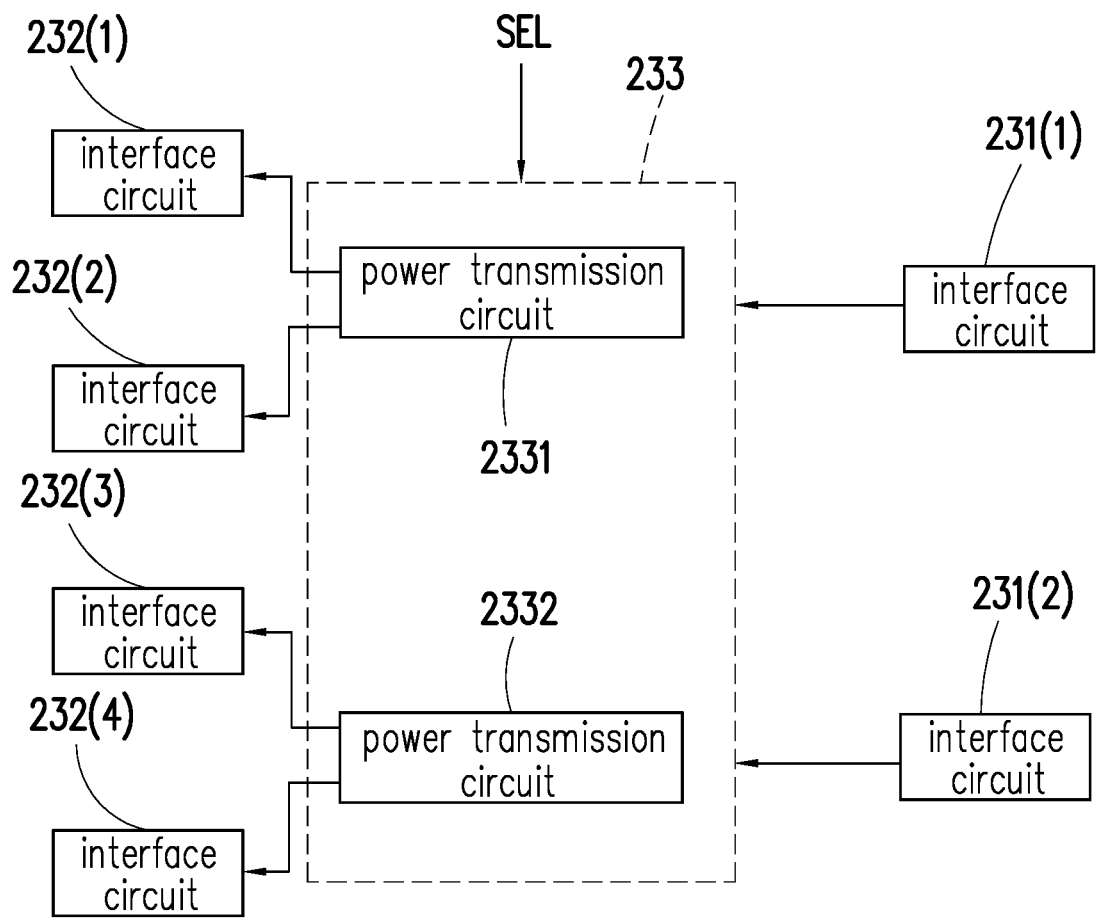
FIG. 2 is a schematic view of a power reuse circuit according to an embodiment of the invention.

FIG. 2 is a schematic view of a power reuse circuit according to an embodiment of the invention. With reference to FIG. 2, a power reuse circuit 23 includes a power transmission circuit 233 and interface circuits 231(1), 231(2), and 232(1)-232(4). Here, the interface circuits 231(1) and 231(2) are respectively identical or similar to the interface circuits 131(1) and 131(2) depicted in FIG. 1, and the interface circuits 232(1)-232(4) are respectively identical or similar to the interface circuits 132(1)-132(4) depicted in FIG. 1; therefore, no further explanation is given hereinafter.

In the present embodiment, the power transmission circuit 233 includes a power transmission circuit (also referred to as a first power transmission circuit) 2331 and a power transmission circuit (also referred to as a second power transmission circuit) 2332. An input terminal of the power transmission circuit 2331 is coupled to at least one of the interface circuits 231(1) and 231(2), and an output terminal of the power transmission circuit 2331 is coupled to the interface circuits 232(1) and 232(2), so as to provide a power transmission path (also referred to as a first power transmission path). An input terminal of the power transmission circuit 2332 is coupled to at least one of the interface circuits 231(1) and 231(2), and an output terminal of the power transmission circuit 2332 is coupled to the interface circuits 232(3) and 232(4), so as to provide another power transmission path (also referred to as a second power transmission path). The first power transmission path and the second power transmission path are electrically isolated from each other. Thereby, assuming that the power specification of the power transmitted through the interface circuit 231(1) is different from the power specification of the power transmitted through the interface circuit 231(2), the powers with different power specifications are not affected mutually because different power transmission paths that are electrically isolated from each other are applied to transmit these powers with different power specifications. Besides, the reduction of the number of the second interface circuits coupled to one power transmission path may prevent the power coming from one certain first interface circuit from being excessively distributed to too many second interface circuits, which may lead to insufficiency capabilities of subsequently driving the virtual currency calculating circuit.

Note that the number of the power transmission path provided by the power transmission circuit and the number of the first and second interface circuits coupled to one power transmission circuit are not limited in the invention. For instance, in an embodiment depicted in FIG. 1, the power transmission circuit 133 may provide (only) one power transmission path which is responsible for transmitting all testing powers between the interface circuit module 131 and 132. Alternatively, in another embodiment depicted in FIG. 1, the power transmission circuit 133 may include two power transmission paths. One of the power transmission paths is configured to transmit the testing power between the interface circuit 131(1) and the interface circuits 132(1)-132(3), while the other is configured to transmit the testing power between the interface circuit 131(2) and the interface circuit 132(4).

Please refer to FIG. 1 again. According to an embodiment, the power reuse circuit 13 further includes a testing communication interface 134, and a specification of the testing communication interface 134 may be a power management bus (PMBus) communication interface. The testing communication interface 134 is coupled to the interface circuit module 131 and configured to monitor the testing states of the testing devices 11(1) and 11(2). For instance, the testing communication interface 134 may be externally connected to a signal analyzing device (not shown). The external signal analyzing device may receive testing information SI through the testing communication interface 134. Through analyzing the testing information SI, the external signal analyzing device may obtain the testing state of the testing device 11(1) and/or the testing state of the testing device 11(2). For instance, the testing state of the testing device 11(1) may reflect whether the voltage of the power output from the testing device 11(1) is stable and/or whether the voltage of the power falls within a certain voltage range. Alternatively, in another embodiment, the external signal analyzing device may also send a control command to control the testing device 11(1) and/or the testing device 11(2) through the testing communication interface 134.

According to an embodiment, the power reuse circuit 13 further includes a switch circuit 135. The switch circuit 135 is coupled to the power transmission circuit 133. The switch circuit 135 is configured to send a switch signal SEL to control a conductive state of a power transmission path between the testing device 11(1) (and/or the testing device 11(2)) and the virtual currency calculating circuit 12. In an embodiment, the switch signal SEL can simultaneously control the conductive states of all power transmission paths to be conductive or to be cut off in the power transmission circuit 133. Alternatively, in another embodiment, the switch signal SEL may control the conductive states of some of the power transmission paths to be cut off in the power transmission circuit 133 and control the conductive states of the other power transmission paths to be conductive in the power transmission circuit 133, which can be determined according to actual needs.

In an embodiment depicted in FIG. 2, the power transmission circuit 233 can control the power transmission path provided by the power transmission circuit 2331 and/or the power transmission circuit 2332 to be conductive or cut off according to the switch signal SEL. If the power transmission path provided by the power transmission circuit 2331 (i.e., the first power transmission path) is cut off, then before the first power transmission path resumes conductive, the power coming from the interface circuit 231(1) cannot be transmitted to the interface circuits 232(1) and 232(2). Alternatively, if the power transmission path provided by the power transmission circuit 2332 (i.e., the second power transmission path) is cut off, then before the second power transmission path resumes conductive, the power coming from the interface circuit 231(2) cannot be transmitted to the interface circuits 232(3) and 232(4).

Figure 3:
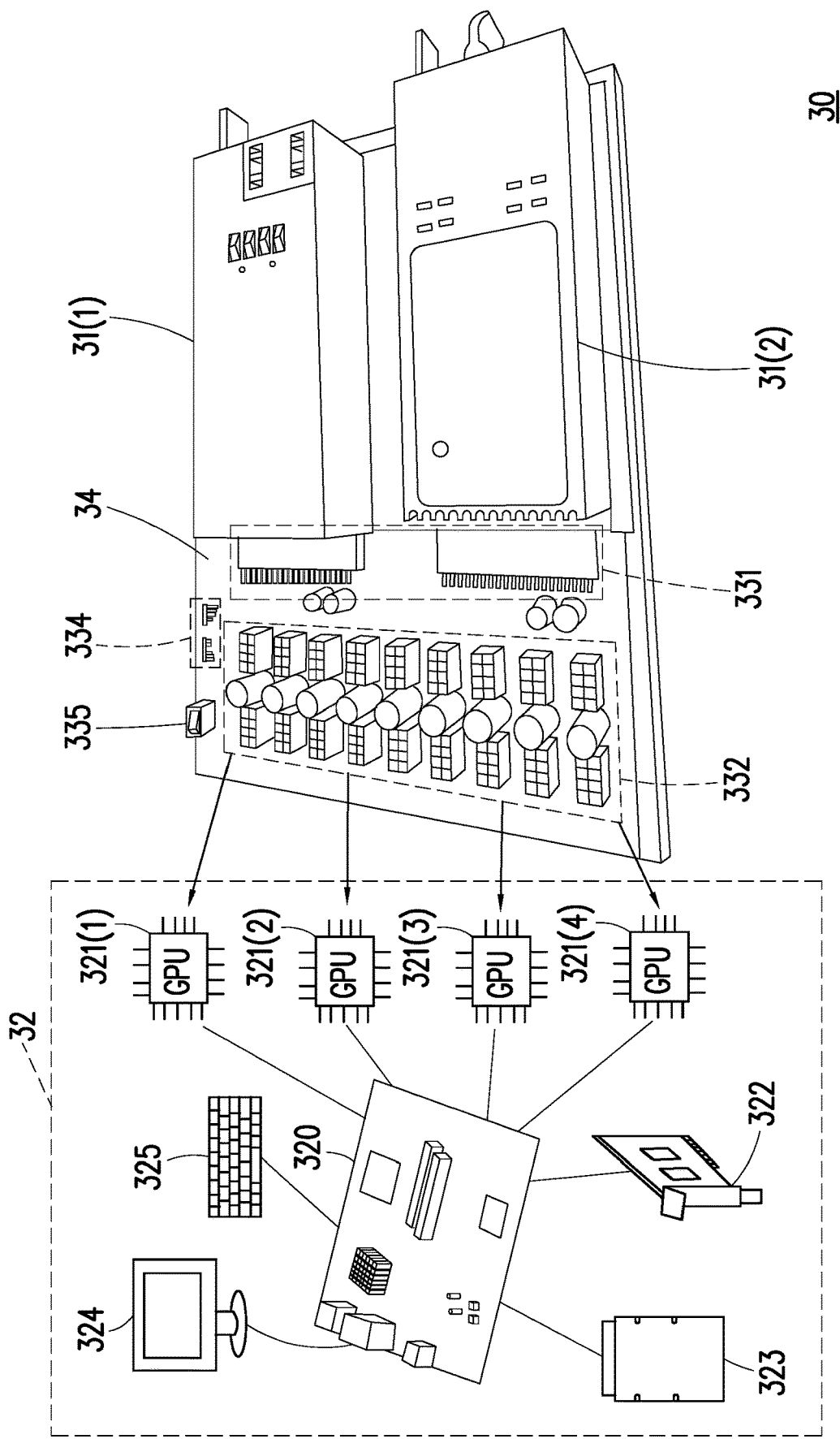
FIG. 3 is a schematic view of a testing power reuse system according to another embodiment of the invention.

FIG. 3 is a schematic view of a testing power reuse system according to another embodiment of the invention. With reference to FIG. 3, a testing power reuse system 30 includes a testing device 31(1), a testing device 31(2), a virtual currency calculating circuit 32, and a carrier device 34. The interface circuit modules 331 and 332 are disposed on the carrier device 34 and coupled to a power reuse circuit (not shown) inside the carrier device 34. The testing devices 31(1) and 31(2) are detachably installed on the carrier device 34 and electrically connected to the interface circuit module 331. The virtual currency calculating circuit 32 may be electrically connected to the interface circuit module 332. Besides, a testing communication interface 334 and/or a switch circuit 335 may be arranged on the carrier device 34.

Note that the testing device 31(1), the testing device 31(2), the interface circuit module 331, the interface circuit module 332, testing communication interface 334, and the switch circuit 335 are respectively identical or similar to the testing device 11(1), the testing device 11(2), the interface circuit module 131, the interface circuit module 132, the testing communication interface 134, and the switch circuit 135 depicted in FIG. 1, and therefore no further explanation is provided hereinafter.

When the testing operation is performed on at least one of the testing devices 31(1) and 31(2), the power (i.e., the testing power) generated by performing said testing operation can be transmitted to the interface circuit module 332 through the interface circuit module 331 (and the internal power reuse circuit). The virtual currency calculating circuit 32 can receive the testing power as a driving power through the interface circuit module 332 to perform the virtual currency calculating operation.

In the present embodiment, the virtual currency calculating circuit 32 includes a power interface circuit, a calculating chip, and a network interface circuit. In the present embodiment, the calculating chip refers to graphics processing units (GPUs) 321(1)-321(4), for instance, and the power interface circuit is disposed on the GPUs 321(1)-321(4). The network interface circuit is, for instance, a network interface card (NIC) 322 for providing Internet connections. Besides, the power interface circuit, the calculating chip, and the network interface circuit can all be coupled to a motherboard 320.

In the present embodiment, the GPUs 321(1)-321(4) can be electrically connected to the interface circuit module 332 through the power interface circuit, so as to receive the testing power from the interface circuit module 332. The received testing power can be used to drive the GPUs 321(1)-321(4) to perform the virtual currency calculating operation. For instance, the GPUs 321(1)-321(4) can apply the block chain technology to calculate the encryption and decryption of the virtual currency. A virtual currency calculating result generated through performing the virtual currency calculating operation can be transmitted to the network (e.g., Internet) through the NIC 322 in a wired or in a wireless manner.

In another embodiment, it is noted that the power interface circuit, the calculating chip, and the network interface circuit in the virtual currency calculating circuit 32 may be implemented in other types of devices and are not limited to those described in the previous embodiments. For instance, according to an embodiment, the power interface circuit may be independently disposed on the motherboard 320, and the calculating chip may be implemented in form of a central processing unit (CPU), a programmable general-purpose or special-purpose microprocessor, a digital signal processor (DSP), a controller, an application specific integrated circuit (ASIC), a programmable logic device (PLD), and so on.

According to an embodiment, the virtual currency calculating circuit 32 can also include a storage device 323. The storage device 323 is coupled to the motherboard 320 and can be configured to store data used by the calculating chip (e.g., the GPUs 321(1)-321(4)) for performing the virtual currency calculating operation. For instance, the storage device 323 can include a volatile storage medium or a non-volatile storage medium. The volatile storage medium is a random access memory, for instance. The non-volatile storage medium is, for instance, a solid state disk (SSD) or a conventional hard disk. Besides, according to an embodiment, the virtual currency calculating circuit 32 may further include input/output devices, such as a screen 324 and a keyboard 325. For instance, the screen 324 and the keyboard 325 may be coupled to the motherboard 320 to provide an input signal or to output a signal.

In the previous embodiments, it is noted that the testing power generated by performing the testing operation on the testing devices is applied to drive the virtual currency calculating circuit. Hence, all of the power reuse circuit 13 depicted in FIG. 1 (or the testing power reuse system 10), the power reuse circuit 23 depicted in FIG. 2, and the carrier device 34 depicted in FIG. 3 (or the testing power reuse system 30) do not have any electronic load element (e.g., a cement resistor) configured for consuming the testing power by heat, whereby the re-utilization rate of the testing power can be improved.

Figure 4:
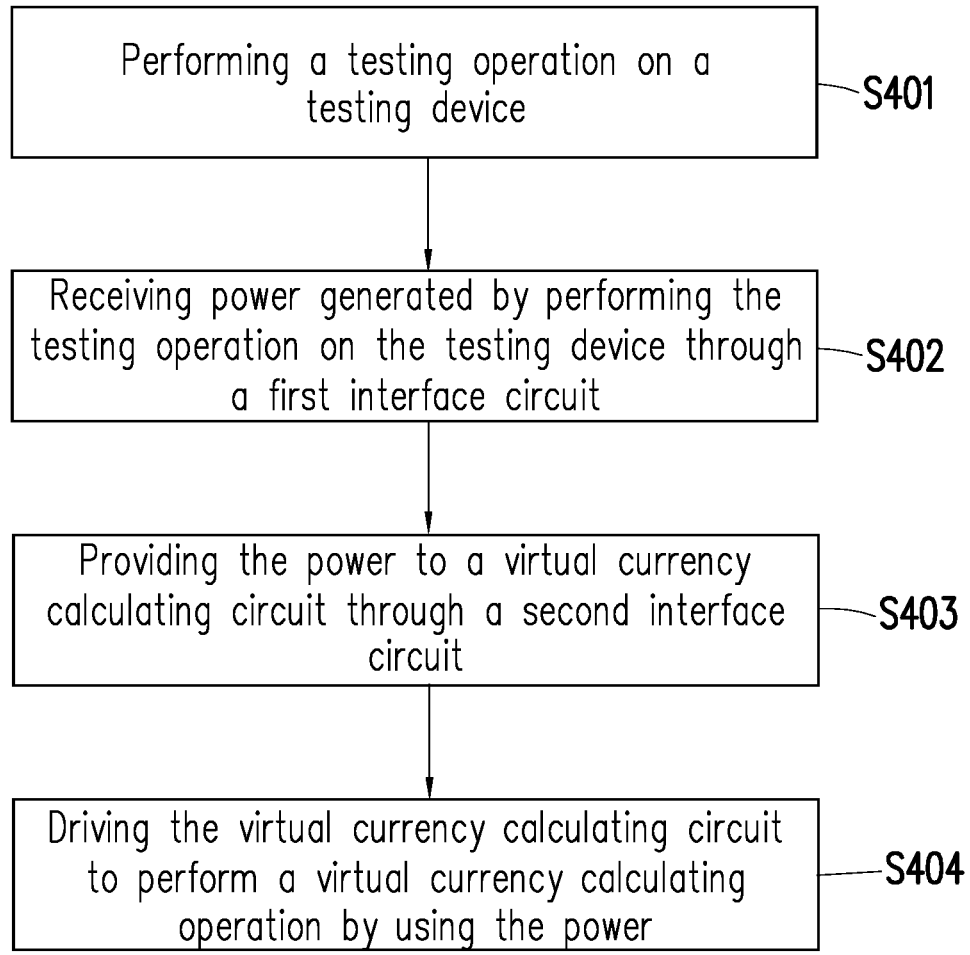
FIG. 4 is a flowchart illustrating a testing power reuse method according to an embodiment of the invention.

FIG. 4 is a flowchart illustrating a testing power reuse method according to an embodiment of the invention. With reference to FIG. 4, in step S401, a testing operation is performed on a testing device. In step S402, power (i.e., testing power) generated by performing the testing operation on the testing device is received through a first interface circuit. In step S403, the power is provided to a virtual currency calculating circuit through a second interface circuit. In step S404, the power is applied to drive the virtual currency calculating circuit to perform a virtual currency calculating operation.

Each step depicted in FIG. 4 is already elaborated above and thus will not be explained hereinafter. Note that each step depicted in FIG. 4 may be performed in form of a plurality of programming codes or circuits, which should however not be construed as a limitation to the invention. Besides, the method depicted in FIG. 4 may be applied according to the exemplary embodiments provided above or may be applied independently, which should however not be construed as a limitation to the invention.

To sum up, after the testing operation is performed on the testing device, the testing power generated by performing the testing operation may be reused for driving the virtual currency calculating circuit to perform the virtual currency calculating operation. In comparison with the conventional way to consume the testing power by heat, the use efficiency of the testing power provided herein can be effectively improved. Besides, the testing power provided herein may be applied to perform a real-time virtual currency calculation, so as to gain additional revenue.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A testing power reuse system, comprising:
   at least one testing device;
   at least one virtual currency calculating circuit; and
   a power reuse circuit, coupled to the at least one testing device through at least one first interface circuit and coupled to the at least one virtual currency calculating circuit through at least one second interface circuit,
   wherein the power reuse circuit is configured to receive power generated by performing a testing operation on the at least one testing device through the at least one first interface circuit and provide the power to the at least one virtual currency calculating circuit through the at least one second interface circuit, and
   the at least one virtual currency calculating circuit is driven by the power to perform a virtual currency calculating operation.

2. The testing power reuse system as recited in claim 1, wherein a total number of the at least one testing device is at least two.

3. The testing power reuse system as recited in claim 2, wherein power output from a first testing device of the at least one testing device complies with a first power specification, power output from a second testing device of the at least one testing device complies with a second power specification, and the first power specification is different from the second power specification.

4. The testing power reuse system as recited in claim 1, wherein the power reuse circuit comprises a first power transmission circuit and a second power transmission circuit, the first power transmission circuit provides a first power transmission path between the at least one testing device and the at least one virtual currency calculating circuit, the second power transmission circuit provides a second power transmission path between the at least one testing device and the at least one virtual currency calculating circuit, and the first power transmission path and the second power transmission path are electrically isolated from each other.

5. The testing power reuse system as recited in claim 1, wherein the power reuse circuit comprises a testing communication interface,
   wherein the testing communication interface is configured to monitor a testing state of the at least one testing device.

6. The testing power reuse system as recited in claim 1, wherein the power reuse circuit comprises a switch circuit,
   wherein the switch circuit is configured to control a conductive state of a power transmission path between the at least one testing device and the at least one virtual currency calculating circuit.

7. The testing power reuse system as recited in claim 1, wherein the at least one testing device comprises a power supply.

8. The testing power reuse system as recited in claim 1, wherein the at least one virtual currency calculating circuit comprises a power interface circuit, a calculating chip, and a network interface circuit,
   wherein the power interface circuit is coupled to the at least one second interface circuit to receive the power, and the calculating chip is coupled to the power interface circuit and the network interface circuit,
   wherein the calculating chip is configured to perform the virtual currency calculating operation and transmit a virtual currency calculating result to a network through the network interface circuit.

9. The testing power reuse system as recited in claim 1, wherein the power reuse circuit is not equipped with an electronic load element configured for consuming the power by heat.

10. A power reuse circuit, comprising:
    at least one first interface circuit;
    at least one second interface circuit; and
    a power transmission circuit, coupled to the at least one first interface circuit and the at least one second interface circuit,
    wherein the power transmission circuit is configured to receive power generated by performing a testing operation on at least one testing device through the at least one first interface circuit and provide the power to at least one virtual currency calculating circuit through the at least one second interface circuit, so that the at least one virtual currency calculating circuit is driven by the power to perform a virtual currency calculating operation.

11. The power reuse circuit as recited in claim 10, wherein a total number of the at least one first interface circuit is at least two.

12. The power reuse circuit as recited in claim 11, wherein power received from one of the at least one first interface circuit complies with a first power specification, power received from another one of the at least one first interface circuit complies with a second power specification, and the first power specification is different from the second power specification.

13. The power reuse circuit as recited in claim 10, wherein the power transmission circuit comprises a first power transmission circuit and a second power transmission circuit, the first power transmission circuit provides a first power transmission path between the at least one first interface circuit and the at least one second interface circuit, the second power transmission circuit provides a second power transmission path between the at least one first interface circuit and the at least one second interface circuit, and the first power transmission path and the second power transmission path are electrically isolated from each other.

14. The power reuse circuit as recited in claim 10, further comprising:
    a testing communication interface, coupled to the at least one first interface circuit,
    wherein the testing communication interface is configured to monitor a testing state of the at least one testing device.

15. The power reuse circuit as recited in claim 10, further comprising:
    a switch circuit, coupled to the power transmission circuit,
    wherein the switch circuit is configured to control a conductive state of a power transmission path between the at least one first interface circuit and the at least one second interface circuit.

16. The power reuse circuit as recited in claim 10, wherein the power reuse circuit is not equipped with an electronic load element configured for consuming the power by heat.

17. A testing power reuse method, comprising:
- performing a testing operation on at least one testing device;
- receiving power generated by performing the testing operation on the at least one testing device through at least one first interface circuit;
- providing the power to at least one virtual currency calculating circuit through at least one second interface circuit; and
- driving the at least one virtual currency calculating circuit by the power to perform a virtual currency calculating operation.

* * * * *